United States Patent [19]

Philoctete

[11] Patent Number: 5,212,905
[45] Date of Patent: May 25, 1993

[54] PLANT WATERING DEVICE

[76] Inventor: Jean La Mennais H. Philoctete, 2430 NW. 108 St., Miami, Fla. 33167

[21] Appl. No.: 673,780

[22] Filed: Mar. 15, 1991

[51] Int. Cl.$^5$ .............................................. A01G 29/00
[52] U.S. Cl. ........................................... 47/48.5; 47/25
[58] Field of Search ....................... 47/48.5, 79, 24, 25, 47/27

[56] References Cited

U.S. PATENT DOCUMENTS

| | | | |
|---|---|---|---|
| 1,317,569 | 9/1919 | Forster | 47/79 |
| 2,359,981 | 10/1944 | Fleming | 47/48.5 |
| 2,784,528 | 3/1957 | Rudenauer | 47/48.5 |
| 4,087,938 | 5/1978 | Koch | 47/48.5 |
| 5,097,626 | 3/1992 | Mordoch | 47/79 |

FOREIGN PATENT DOCUMENTS

| | | | |
|---|---|---|---|
| 93296 | 8/1897 | Fed. Rep. of Germany | 47/48.5 |
| 322809 | 7/1920 | Fed. Rep. of Germany | 47/79 |
| 514178 | 11/1930 | Fed. Rep. of Germany | 47/48.5 |

*Primary Examiner*—Henry E. Raduazo
*Attorney, Agent, or Firm*—Malloy & Malloy

[57] ABSTRACT

A plant watering device with a self-contained reservoir is placed around a seedling plant to provide a continual flow of water or nutrients to the plant while at the same time conserving the water supply. The plant watering device contains an adjustable drip valve means in fluid communication with the reservoir that delivers water or nutrients dropwise to the plant.

6 Claims, 1 Drawing Sheet

PLANT WATERING DEVICE

BACKGROUND OF THE INVENTION

This invention is a device for providing water to the roots of young plants in a more efficient way, thereby increasing their rate of growth.

When a gardener first starts to plant his seedlings, he often has problems in providing water to his plants. This is because gardeners often use a sprinkler system or have to directly carry water and pour it over the plant in order to water it. Most of the time, the water runs all over the top soil or evaporates before reaching the plant roots.

The present invention provides a more efficient way to water plants without the cumbersome and wasteful use of a sprinkler system. A sprinkler system requires indiscriminate use of water and in most cases has to be turned on and off once or twice daily. Moreover, drops of water from the sprinkler are not distributed evenly to the specific area of the plant roots. This decreases the efficiency of the use of water. The plant watering device, when placed over a plant, keeps the specific area where the roots are located moist at all times. This ensures continual absorption or feeding of water or nutrient by the roots, which makes plants gro faster and healthier. In places where the use of water is restricted, the device will deliver water on a continual basis while conserving the water supply.

SUMMARY OF THE INVENTION

The present invention is a hollow cylindrical device that includes a self-contained reservoir for storage of water or liquid plant food wherein the hollow central portion of the device is placed around a young plant. One hollow portion is wide enough to permit young plants to receive sunlight and exposure to the outside environment. The water or liquid plant food can be released by gravity through a threaded flexible tube with an adjustable drip valve. Water which passes through the drip valve will be released to the plant roots. The device is additionally equipped with a threaded female connection that allows for easy attachment to a conventional garden hose for filling the reservoir. After the reservoir of the device is filled, water will start releasing from the top of the reservoir through a series of small holes, onto the plant within the device.

DETAILED DESCRIPTION OF THE DRAWINGS

Figure 1:
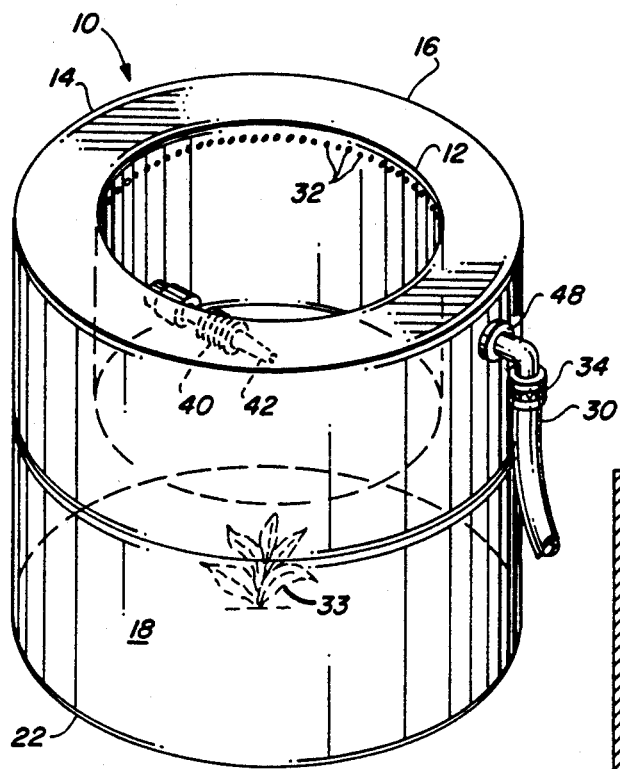
FIG. 1 is a perspective view illustrating the novel plant watering device enclosing a plant and connected to a garden hose.
Figure 3:
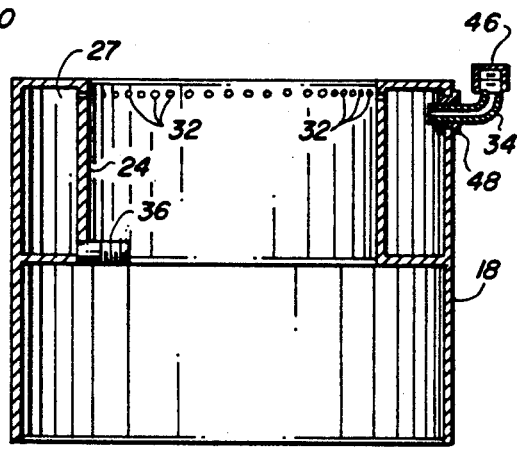
FIG. 3 is a vertical cross-sectional view illustrating the plant watering device.
Figure 4:
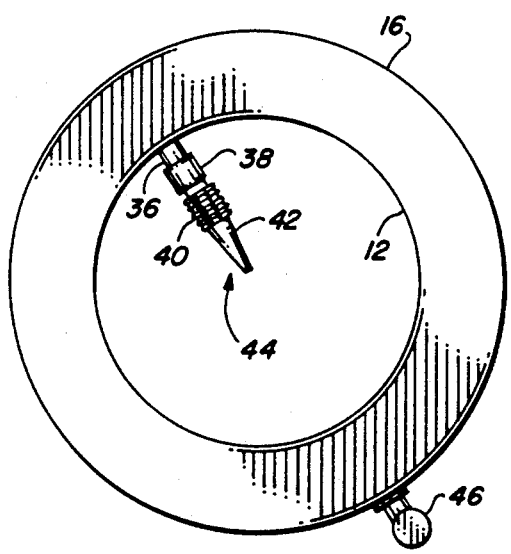
FIG. 4 is a top view illustrating the plant watering device.
Figure 2:
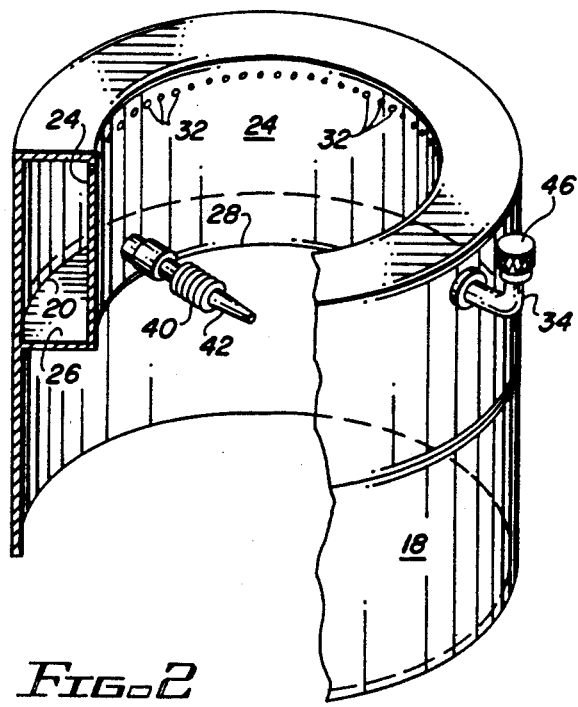
FIG. 2 is a perspective view partially in section illustrating the plant watering device.

Applicant's novel plant watering device will now be described by referring to FIGS. 1-4 of the drawing. The plant watering device is generally designed numeral 10.

The plant watering device 10 is cylindrical in shape and is comprised of an outer cylindrical wall 18 and an inner cylindrical wall 24. The upper distal ends 16, 12 of the outer 18 and inner 24 cylinderical walls, respectfully, are joined together in surrounding relationship by a top ring-shaped member 14. The lower distal end 28 of the inner cylindrical wall 24 and the center 20 of the outer wall 18 are joined together in surrounding relationship by a bottom ring-shaped member 26 which is oriented in parallel relationship to the top ring-shaped member 14, thus creating a cylindrical reservoir 27 in the upper part of the device. The outer cylindrical wall 18 extends downwardly from the bottom ring-shaped member 26 such that the lower distal end 22 of the wall 24 surroundingly engages the ground at the base of the plant, thereby supporting the reservoir above the level of the ground. The upper distal end 12 of the inner wall 24 is provided with a plurality of small apertures 32. These apertures 32 serve to release water pressure by delivering water to a plant 33 when the reservoir 27 is full.

A female hose connection 34 projects ouwardly from the resevoir 27 through the outer cylindrical wall 18 allowing for access to the reservoir 27. The female hose connection 34 houses a round rubber diaphragm 48 which is seated within the outer wall 18 thereby allowing for sealing engagement of the hose connection 34 with the reservoir 27. The diaphragm 48 additionally allows for rotation of the connection 34 about its horizontal axis to facilitate convenient attachment of a garden hose 30. The threaded female hose connection 34 is additionally provided with a threaded cap 46 for use when the hose 30 is not connected thereto, which keeps foreign matter out of the reservoir 27.

The inner cylindrical wall 24 is provided with a threaded male valve attachment member 36 which allows for the attachment of an adjustable drip valve means 44. The valve means 44 is comprised of a threaded female attachment member 38 which receivingly accepts the male valve attachment member 36 for attachment thereto, a flexible accordion type hose 40, and an adjustable drip valve 42. When secured to the male valve attachment member 36, the valve means 44 is in fluid communication with the reservoir 27 thus allowing water or liquid plant food to pass through the drip valve means 44 and subsequently be released to the plant 33 dropwise on a continual basis. The flexible hose 40 allows for precise positioning of the valve means 44 with respect to the height and growth of the plant 33.

The plant watering device 10 can be additionally utilized as a water containment means about the base of a plant 33 such as when water is poured direclty on the plant 33 through the center of the device 10. Since the lower distal edge 22 of the outer wall 24 is in abutting relationship with the ground surrounding the base of the plant 33. The water is contained within the confines of the device 10 until it is absorbed by the roots of the plant 33, thereby minimizing run off over the adjacent top soil.

The plant watering device 10 is preferably formed of plastic, however, the scope of the invention is in no way limited thereto. The size of the device 10 is variable and dependent upon the type of plant 33 for which it is intended.

In an alternate embodiment, two or more of the above described devices 10 may be disposed about a pluraqlity of plants wherien a single hose 30 is fluidly connected to each of the device 10. T or Y-shaped hose couplings (not shown) allow for the flow of water from the hose 30 to be delivered to each of the devices 10.

What is claimed is:

1. A plant watering device adapted to be placed on the ground about the base of a plant for delivering liquid to said plant comprising:

a hollow cylindrical member containing an upper section and a lower section, said upper section containing an inner cylindrical wall and an outer cylindrical wall, said outer cylindrical wall further extending downwardly to form said lower section wherein the bottom distal edge of said outer cylindrical wall is adapted to be disposed in surrounding relationship to the ground at the base of the plant, said upper section further cmoprising a top ring-shaped member and a bottom ring-shaped member, said top ring-shaped member and said bottom ring-shaped member being parallel and disposed in surrounding relationship to the corresponding edges of said inner cylindrical wall and said outer cylindrical wall thereby defining an interior chamber for the storage of said liquid, a valve means attached to and extending inwardly from said inner cylindrical wall such that the liquid within said interior chamber can be delivered to said plant, a liquid supply connection means on said upper section adapted to be connected to a liquid supply conduit, said liquid supply connection means being disposed in fluid communication with said interior chamber such that said liquid flows from said supply. conduit to said interior chamber.

2. The plant watering device of claim 1 wherein said valve means is comprised of a male threaded member which extends inwardly from said inner cylindrical wall, a corresponding female threaded member, said female threaded member engagingly connected to a flexible hose member, said flexible hose member being connected to an adjustable drip valve, said flexible hose member allowing for the precise positioning of said adjustable drip valve in relationship to said plant.

3. The plant watering device of claim 2 wherein said liquid supply connection means further contains a cap means which allows for said interior chamber to be completely sealed when said liquid supply conduit is not disposed thereto.

4. The plant watering device of claim 3 wherein said liquid is comprised of water or plant food.

5. The plant water device of claim 3 wherien said liquid supply conduit is a conventional garden hose.

6. The plant watering device of claim 3 wherien said upper section of said hollow cylindrical member further contains a row of apertures disposed in surrounding relationship to the upper distal edge of said inner cylindrical wall such that when said interior chamber is full, said liquid will flow through said apertures in a sprinkling fashion, allowing for said liquid to contact said ground at the base of the plant.

* * * * *